Nov. 4, 1930.  R. S. BROWN  1,780,889
METAL WORKING MACHINE
Filed Jan. 14, 1928  4 Sheets-Sheet 1
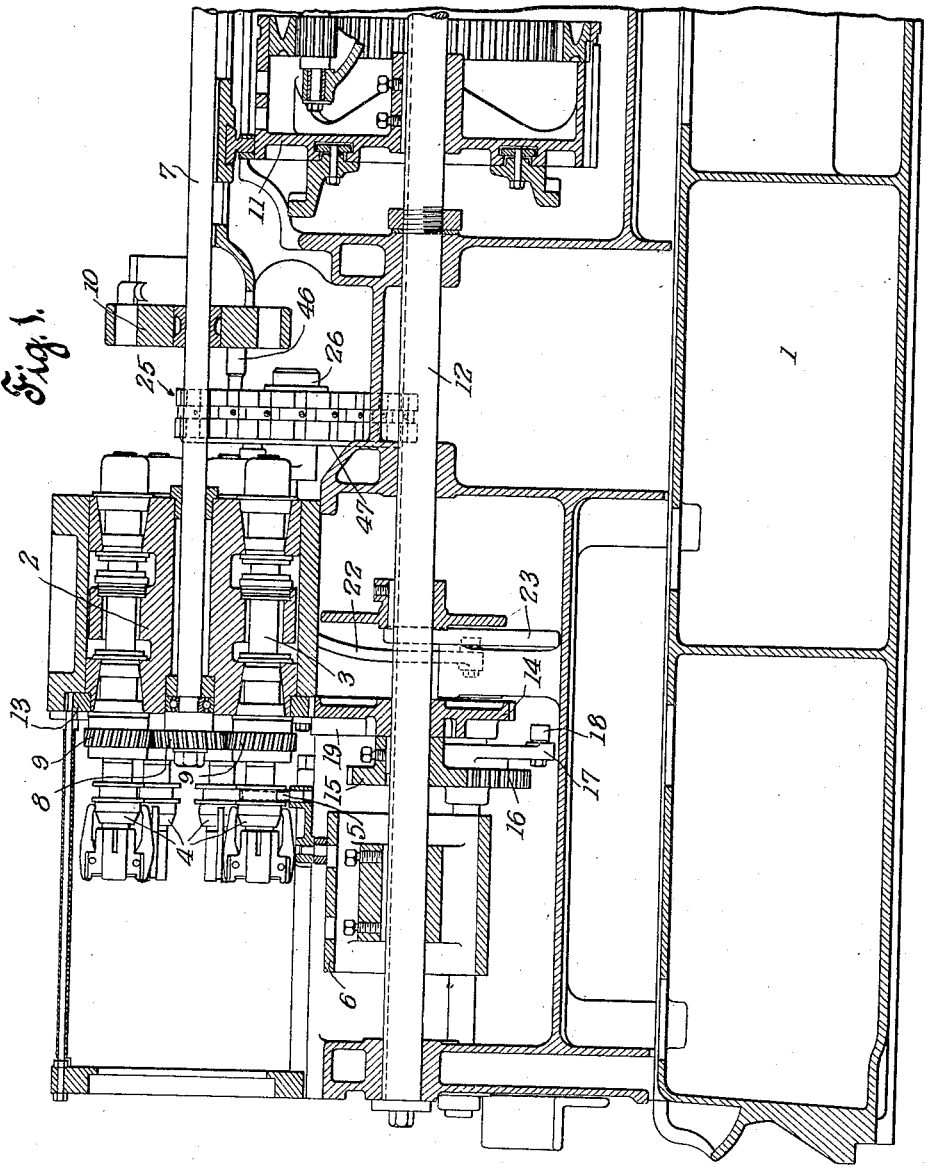
INVENTOR.
Robert S. Brown
BY
ATTORNEYS.

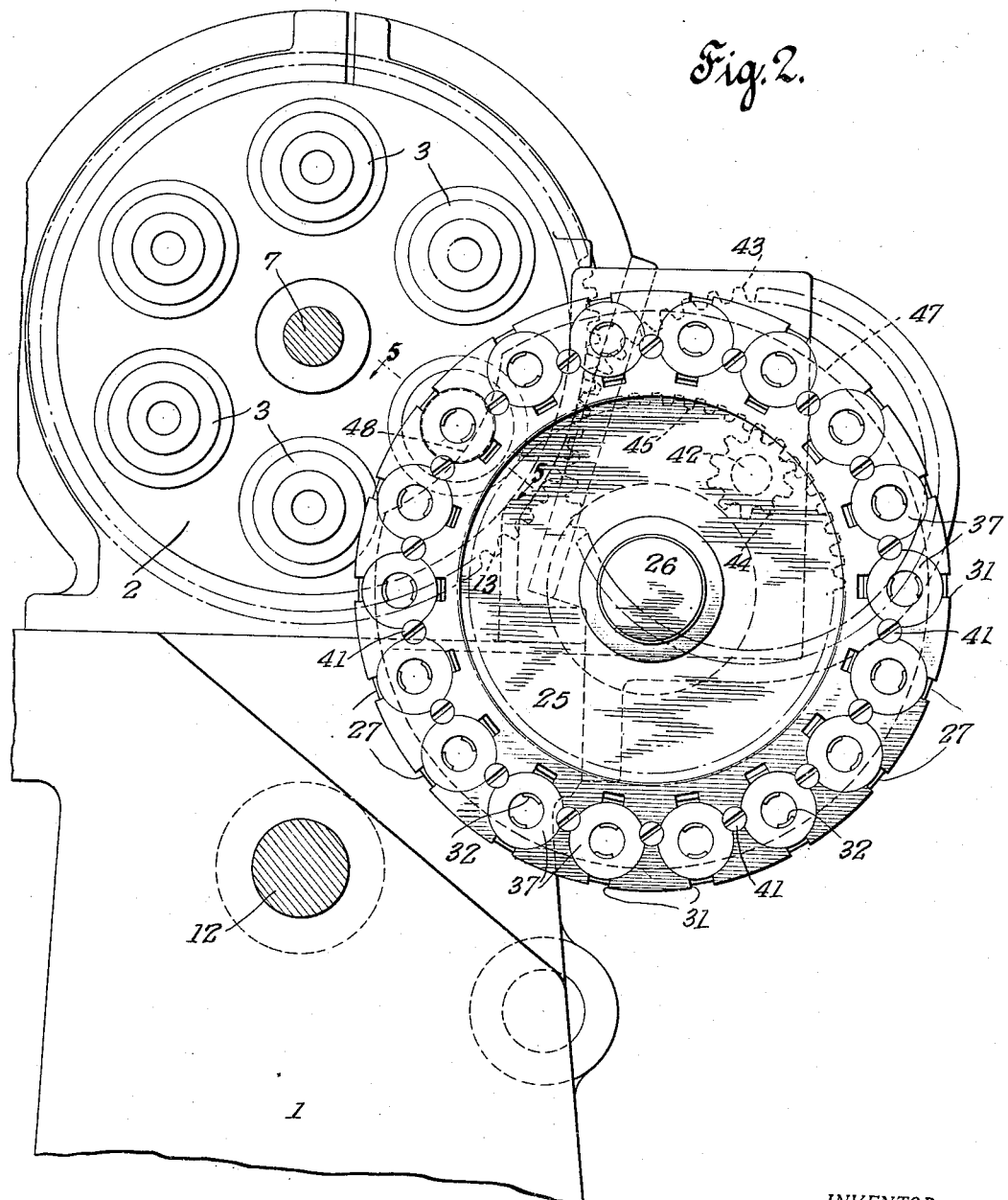

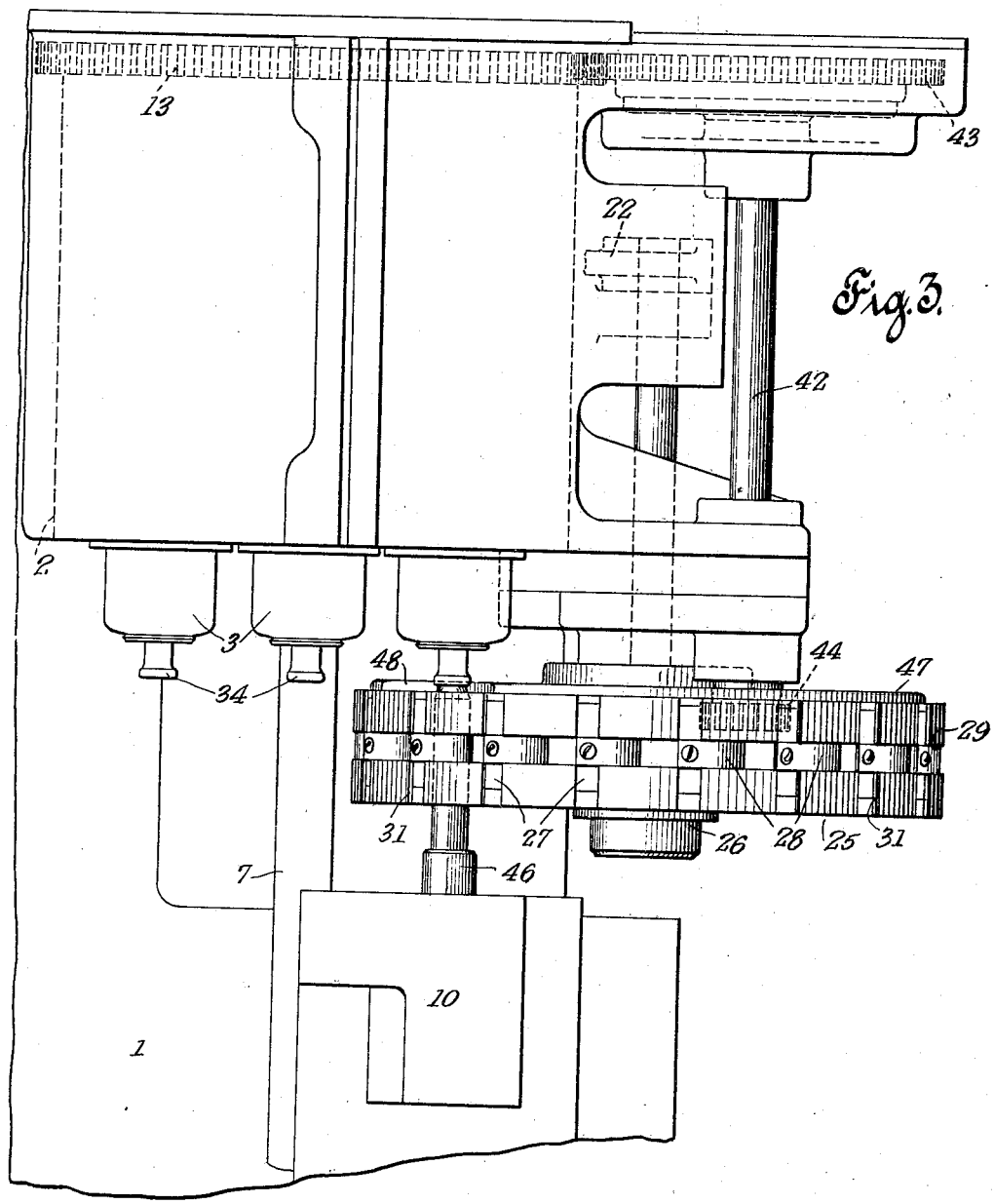

Nov. 4, 1930.  R. S. BROWN  1,780,889
METAL WORKING MACHINE
Filed Jan. 14, 1928    4 Sheets-Sheet 4
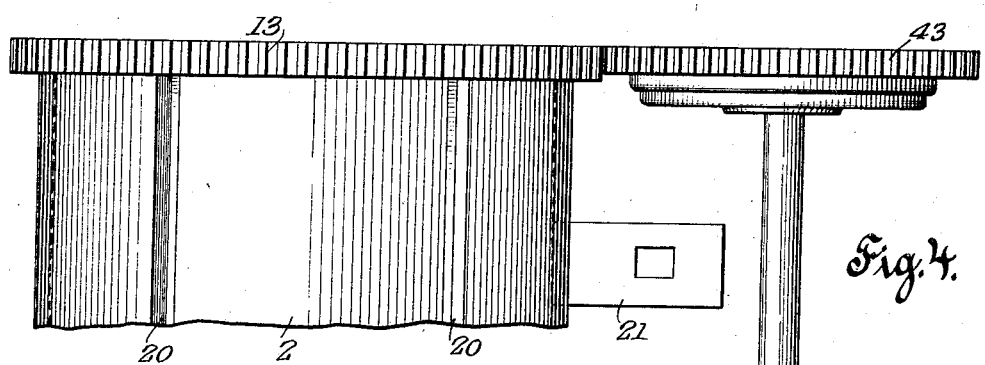
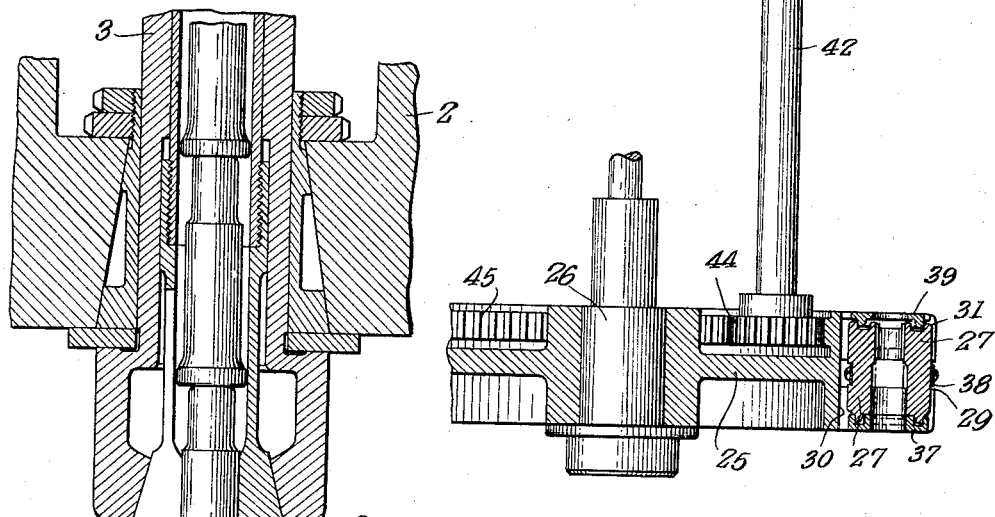
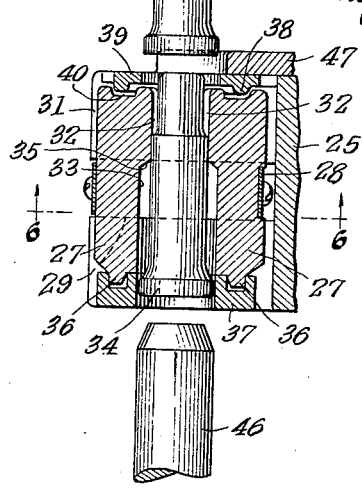
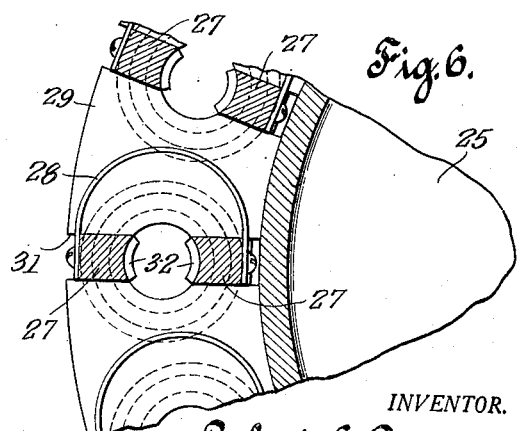
INVENTOR.
Robert S. Brown
BY
ATTORNEYS.

Patented Nov. 4, 1930

1,780,889

UNITED STATES PATENT OFFICE

ROBERT S. BROWN, OF NEW BRITAIN, CONNECTICUT, ASSIGNOR, BY MESNE ASSIGNMENTS, TO THE NEW BRITAIN-GRIDLEY MACHINE COMPANY, OF NEW BRITAIN, CONNECTICUT, A CORPORATION OF CONNECTICUT

METAL-WORKING MACHINE

Application filed January 14, 1928. Serial No. 246,843.

My invention relates to a metal working machine, and more specifically to a multiple spindle machine in which a plurality of work carriers are so arranged and related to each other as to permit the transfer of work pieces from one carrier to another.

It is an object of the invention to provide a machine of the character indicated wherein a plurality of indexible work carriers are indexed and held so as to permit the transfer of work pieces from one carrier to another.

It is another object to provide two work carriers with a common means for indexing both carriers simultaneously and in a certain predetermined relation to each other.

It is a more specific object to provide a machine with a magazine feed device so arranged as to permit the transfer of work pieces from the magazine to a carrier.

It is another object to provide a novel form of magazine feed device for a machine of the character indicated.

Other objects and the features of the invention will become apparent upon a reading of the specification taken in connection with the illustrative drawings.

While the invention may be variously embodied and embodied in machines of various types, I have chosen as an illustrative embodiment a station type of machine employing rotary work carrying spindles and non-rotatable advancing tools.

In said drawings which show, for illustrative purposes only, a preferred embodiment of the invention—

Fig. 1 is a fragmentary longitudinal vertical sectional view of a metal working machine illustrating features of the invention;

Fig. 2 is an enlarged view in elevation of two work carriers shown in Fig. 1 and illustrating their mutual relationship;

Fig. 3 is an enlarged plan view of the two carriers and the associated mechanism of Fig. 1;

Fig. 4 is an enlarged fragmentary view illustrating a means for indexing two carriers simultaneously and in predetermined relation to each other;

Fig. 5 is an enlarged fragmentary detail sectional view of two carriers and illustrating one method of transferring work pieces from one carrier to the other;

Fig. 6 is a fragmentary sectional view of a work carrier taken substantially in the plane of the line 6—6 of Fig. 5.

In said drawings, 1 indicates the base or frame of a well known type of metal working machine embodying an indexible carrier 2. The carrier has a plurality of work holding means, and, in the illustrative form shown, the work holding means are mounted upon rotatable spindles 3—3, journalled in the carrier 2 and equidistantly spaced from each other and from the axis of the carrier 2. Each spindle carries a suitable chuck, the particular form shown being of the collet type illustrated more in detail in Fig. 5, actuated by means of a wedge spool 4, which may in turn be moved by means of a pin 5 under the control of a cam drum 6, as will be readily understood by one skilled in the art. As shown, the wedge spool 4 of each spindle is actuated only in the loading position of each spindle as it reaches such position on the indexing of the spindle carrier 2.

The spindles 3—3 may be rotated by means of a shaft 7 passing centrally through the carrier 2 and provided at the rear with a gear 8, meshing with corresponding gears 9—9 carried upon the respective spindles. Work pieces held in the chucks of the respective spindles are acted upon by tools (not shown) carried by a tool carrier 10, which, in the form shown, is fed forwardly by a cam on the main cam drum 11. If desired cross slides (not shown) may also be employed.

The main cam shaft 12 carries the cam drum 11 and the cam drum 6, as is usual in machines of this type. The particular driving means for the cam drum 11 and the main cam shaft 12, as well as for the spindle drive shaft 7, may be conventional.

The carrier 2 is indexed step by step by suitable means and, in the form shown, the spindle carrier 2 has a gear 13 secured thereto which meshes with a second gear 14, rotatably mounted upon the cam shaft 12. A gear 15 carried upon and rotatable with the cam shaft 12 meshes with a gear 16 upon a countershaft, which may also carry a Geneva arm 17 having a roller 18 thereon. The gear 14 is secured to or may be part of a star wheel having slots 19 therein, for the reception of the roller 18. Now, upon rotation of the cam shaft 12 the gear 15 drives the gear 16, and with it the arm 17 and roller 18, which enters the slots 19 periodically, so as to rotate the gears 14, and consequently the main gear 13 on the spindle carrier 2. The spindle carrier 2 is thus indexed.

The carrier 2 may have the appropriate number of grooves or slots 20—20, for the reception of a locking bolt 21 (Fig. 4). This locking bolt, which may be of conventional form, is actuated by means of a lever 22, which is moved by a cam 23 carried by the cam shaft 12. It will, of course, be understood that the parts are timed so that the locking bolt 21 will be withdrawn prior to indexing of the turret or carrier 2, and will be again projected into one of the slots 20 after each indexing movement has been completed.

Machines of the general type as thus far described are old and well known in the art, and need no further description or explanation at this time.

In accordance with my invention a second carrier or turret is employed and so related to the carrier 2 as to bring the stations of the two carriers into register with each other periodically for the purpose of permitting a transfer of work pieces from one carrier to the other. In the form shown the second carrier 25 is mounted upon a shaft 26, which may either be merely a stub shaft having the carrier 25 journalled thereon, or it may be a shaft journalled in bearings (not shown) but still permitting rotation of the work carrier 25. The carrier 25 is provided with a plurality of work holding means which, in the specific example illustrated, are not spindles such as those carried by the carrier 2, but are in the form of chucks, consisting of opposed jaws 27—27, resiliently urged toward each other by means of a spring 28. The work carrier 25 may be in the form of a disk having a thick peripheral flange, which is slotted circumferentially at 29 and which is provided with a plurality of bores 30—30, for the reception of the inner ends of the jaws 27—27 of the work holding chucks. The jaws 27—27 are held and guided in transverse slots 31—31, in the periphery of the carrier 25. The jaws may each include work holding portions 32—32 at the front side, and at the rear these jaws are preferably relieved, as indicated at 33—33, for the purpose of permitting an enlarged portion of a work piece 34 to be received in the space formed by relieving the jaws at 33, and the work piece may be gripped by its smaller diameter, if desired. The relieved portions of the jaws are preferably tapered, as at 35, to permit the same to be spread apart by the enlarged head on the work piece 34, as will be clear.

The rear ends of the jaws may be provided with projecting bearing studs 36—36, which are received in corresponding recesses in a ring 37. The forward ends of the jaws are preferably guided upon projecting portions 38—38, carried by a ring or disc 39, secured to the face of the carrier 25. The front ends of the jaws 27—27 have elongated slots 40, for the reception of the projecting ends 38, so that considerable spreading movement of the jaws is permitted. The rings 37—37, as well as the corresponding rings 39—39 on the opposite side of the carrier 25, may be held in place, as by means of screws 41—41, as will be seen in Fig. 2.

The carriers 2 and 25 are so proportioned and spaced that a circle through the axes of the spindles 3—3 and a circle through the centers of the work holding chucks of the carrier 25 are tangent to each other at one point, and consequently at that point one of the spindles and one of the work holding chucks on the carrier 25 may be in registry or in alignment with each other.

The carrier 25 is indexed at the time of indexing of the carrier 2, and I prefer to index both carriers by a common means, such as the star wheel or Geneva motion hereinbefore described.

In the form shown I employ a shaft 42, carrying a gear 43, meshing with and driven by the gear 13 carried by the carrier or turret 2. The shaft 42 at its opposite end carries a pinion 44, which meshes with an internal gear 45, movable with the carrier 25. The Geneva motion and gearing for driving the same, as well as the gearing just described and shown more particularly in Fig. 4, are proportioned so that each spindle 3 and each chuck on the carrier 25 will be successively moved to and stopped at the tangent point of the circles mentioned, that is to say, after each indexing movement a spindle on the carrier 2 and a chuck on the carrier 25 will be in registry.

In the particular form of the device herein illustrated, the carrier 25 is designed to be fed with individual work pieces, as shown, for example, in Fig. 5, and the work pieces from the work holding means of the carrier 25 are automatically transferred to the chucks carried by the spindles 3. The transferring means which I have illustrated is a simple plunger 46, carried by the tool slide 10 and positioned in alignment with the point of registry of a spindle 3 and a chuck on the carrier 25. A plate 47 may be carried by the frame of the machine or other suitable part and may substantially cover the open ends of the chucks on the carrier 25, so that an operative, in filling the magazine or carrier 25, cannot push the work pieces too far through the chucks. As will be seen particularly in Figs. 2 and 3, the plate 47 is provided with a scallop 48, so as to expose the open end of the chuck or carrier 25, which is in registry with the spindle in loading position and thus permit the ejection of a work piece from the carrier 25.

The operation of the device is as follows:

An operative may fill the magazine or carrier 25 with appropriate work pieces. During the rotation of the spindle shaft 7 the spindles are rotated, and during the rotation of the cam shaft 12 the locking bolt 21 is withdrawn by the cam 23 and the spindle carrier 2 indexed by means of the gear 13 and Geneva mechanism hereinbefore described. During the indexing of the carrier 2, the carrier 25 is also indexed through the gearing shown more particularly in Fig. 4, so as to bring each chuck of the carrier 25 successively into registry or alignment with the spindle which has been indexed to the loading position. Upon further rotation of the cam shaft the locking bolt 21 is again projected and locks the spindle carrier 2 in position and, in a simple magazine device as herein illustrated, no separate locking means need be employed for the magazine or carrier 25, since the gearing shown in Fig. 4 serves to hold the carrier 25 in indexed position with a sufficient degree of accuracy. Upon rotation of the cam shaft 12 the cam 6 serves to open the chuck on the spindle in the loading position, and upon the advance of the tool slide 10, under the influence of the cam drum 11, the plunger 46 forces the work piece through the chuck on the carrier 25 and into the chuck on the registering spindle 3. The tools carried by the tool slide 10 perform their respective operations upon the work pieces in the other spindle chucks. Before the two carriers are again indexed the cam 6 may again close the chuck in the spindle which has just been loaded.

It is to be understood that during the feeding of a new work piece into a chuck in a spindle 3, the work piece previously in such spindle chuck is forced rearwardly through the hollow spindle 3, and when sufficient finished work pieces have accumulated in the spindles 3, the rearmost work piece will be forced out each time that a new work piece is transferred to each spindle.

While the invention has been described in connection with one particular kind of machine and a carrier 25 has been indicated as merely a magazine for holding individual work pieces and permitting the same to be transferred to chucks carried by the spindles 3, it is to be understood that the invention is of broader application and may be employed in connection with other types of machines and embodied in other forms.

I claim:

1. In a machine of the character indicated, a spindle carrier, a group of spindles carried by said spindle carrier and arranged equidistant from the axis of the carrier, work holding means for each spindle, means for indexing said spindle carrier including a gear on said carrier, means for holding said carrier in indexed position, a second work holding carrier, a plurality of work holding means on said second work holding carrier and arranged equidistant from the axis of said carrier, gearing connecting said first carrier with said second carrier for indexing said second carrier when said first carrier is indexed, said gearing being arranged to periodically bring work holding means in said second carrier opposite work holding means in said first carrier to permit work held in one carrier to be transferred to the other carrier.

2. In a machine of the character indicated, two work holding carriers, work holding means on each of said carriers, means for indexing one of said carriers, connecting means between said carriers for indexing the other carrier when the first carrier is indexed, and means for periodically causing work holding means in one carrier to register with work holding means in the other carrier, a fixed plate adjacent said other carrier and having a recess therein, and means to transfer work pieces from one carrier to another through said recessed plate.

3. In a machine of the character indicated, a work carrier having a plurality of rotary spindles therein, work holding means for each spindle, means for indexing said carrier, a second carrier, means connecting said carriers for causing both carriers to be indexed simultaneously, said second carrier having a plurality of work holding means, said carriers being arranged so as to bring one work holding means in each carrier into registry for each indexing movement, a fixed plate adjacent said other carrier and forming an abutment for work pieces in work holders in said other carrier, said plate having a recess therein, and means to transfer work pieces from one carrier to another through said recessed plate.

4. In a machine of the character indicated, a spindle carrier having a plurality of work carrying spindles therein, a gear carried by said carrier, means for rotating said gear periodically to index said carrier, a second carrier, means for indexing said second carrier through said gear on said spindle carrier, said second carrier having a plurality of work holding means thereon, said carriers being arranged so as to bring one work holding means in each carrier into registry with each other for each indexing movement, a fixed plate adjacent said second carrier and enclosing the indexing mechanism, said plate having a recess therein, and means to transfer work pieces from said second carrier to said first carrier through said recessed plate.

5. In a machine of the character indicated, a pair of carriers, each having a plurality of work holding means thereon, a common means for indexing both of said carriers simultaneously and arranged to bring work holding means of one carrier into registry with work holding means on the other carrier for each indexing movement, a tool carrier, a plunger on said tool carrier means for advancing one of said work holding carriers and said tool carrier relatively to each other, said plunger operating to transfer a work piece from one carrier to the other during the advancing movement of said tool carrier and work carrier relatively to each other.

6. In a machine of the character indicated, a spindle carrier, a plurality of rotatable spindles therein, means for indexing said carrier, a magazine feed member having a plurality of means for holding work pieces, means connecting said work carrier and said magazine feed member to cause one of said work holding means to come into registry with one of said spindles for each indexing movement, a tool slide, means for advancing the same relatively to said spindle carrier, a fixed plate adjacent said feed member for axially positioning said work pieces and means carried by said tool slide for transferring a work piece from said magazine feed member to the spindle which is in registry therewith.

7. In a machine of the character indicated, a work carrier having a plurality of work holding means thereon, means for indexing said carrier, a second work holding carrier, a gear carried by said first carrier and means actuated by said gear for indexing said second carrier while said first carrier is being indexed, said carriers being arranged to cause a registry of work holding means in each of said carriers for each indexing movement so as to permit the transfer of work pieces from one carrier to the other, a fixed plate adjacent one of said carriers, and means to transfer a work piece through said plate to a work holder on the spindle opposite thereto.

8. A magazine feed device comprising a carrier having a plurality of work piece holding means thereon, each of said plurality of work piece holding means including resiliently pressed jaws for gripping the work piece, said jaws being relieved at the rear sides to permit a work piece to be grasped on its small diameter while receiving an enlargement in the space provided by said relieved jaws, said jaws being movable to permit the enlargement of a work piece to spread said jaws during the ejection of the work piece.

ROBERT S. BROWN.